United States Patent [19]

LoCicero et al.

[11] Patent Number: 5,489,162
[45] Date of Patent: Feb. 6, 1996

[54] FASTENING

[75] Inventors: Rae-Ann LoCicero, Chelmsford; Stuart Morgan, Westford; Michael Romm, Brighton; Robert Barker, Lunenburg, all of Mass.

[73] Assignee: Digital Equipment Corporation, Maynard, Mass.

[21] Appl. No.: 468,881

[22] Filed: Jun. 6, 1995

Related U.S. Application Data

[63] Continuation of Ser. No. 372,687, Jan. 13, 1995, abandoned, which is a continuation of Ser. No. 16,010, Feb. 10, 1993, abandoned.

[51] Int. Cl.⁶ .................................................. F16B 2/00
[52] U.S. Cl. ........................... 403/331; 403/334; 403/353; 403/387
[58] Field of Search ....................................... 403/331, 333, 403/334, 353, 381, 375, 245, 246, 263, 253, 345, 387; 82/581, 588.1; 29/191, 192

[56] References Cited

U.S. PATENT DOCUMENTS

| | | | |
|---|---|---|---|
| 3,142,386 | 7/1964 | Skubic | 211/191 |
| 3,156,282 | 11/1964 | Bedford, Jr. | 403/353 X |
| 3,499,672 | 3/1970 | Sunasky | 403/345 |
| 3,858,996 | 1/1975 | Jarvis | 403/353 |
| 3,881,829 | 5/1975 | James | 211/192 X |
| 3,921,365 | 11/1975 | Nute, Jr. et al. | 403/345 |
| 4,106,630 | 8/1978 | Rosenband | 211/191 |
| 4,165,944 | 8/1979 | Sunasky | 211/192 X |
| 4,549,665 | 10/1985 | Smitley | 403/387 X |
| 5,061,108 | 10/1991 | Bien et al. | 403/331 X |

*Primary Examiner*—Kenneth J. Dorner
*Assistant Examiner*—Harry C. Kim
*Attorney, Agent, or Firm*—Arthur W. Fisher; Denis G. Maloney; Lindsay G. McGuinness

[57] ABSTRACT

In general, in one aspect, the invention features a fastener having two mating pieces. One of the mating has a rigid surface of thickness q, and a hole in the surface, the hole including a slot defined by two generally parallel edges separated by a distance r. The other mating piece has a base and a pair of wings held above the base to define two generally parallel channels spaced to accommodate the two parallel edges of the slot, the channels having a thickness greater than q, the span of the wings being greater than r.

10 Claims, 6 Drawing Sheets

5,489,162

FASTENING

This application is a continuation, of application Ser. No. 08/372,687 filed Jan. 13, 1995, now abandoned which is a continuation, of application Ser. No. 08/016,010, filed Feb. 10, 1993, now abandoned.

BACKGROUND OF THE INVENTION

This invention relates to fasteners.

Fasteners are among the oldest of man's inventions. The main goal of most fasteners is to eliminate or control movement of the item being fastened. For many traditional fasteners (including pins, nails, and adhesive tape), nothing special needs to be done ahead of time to the item (fabric, wood, or paper) to be fastened.

Other fasteners (screw-and-nut, hook-and-loop, snaps, zippers, shoulder screw and keyhole slot, to name a few) require two mating elements. Also some step (sewing, crimping, preforming of metal) may need to be taken ahead of time to prepare the item to be fastened.

SUMMARY OF THE INVENTION

In general, in one aspect, the invention features a fastener having two mating pieces. One of the mating pieces has a rigid surface of thickness q, and a hole in the surface, the hole including a slot defined by two generally parallel edges separated by a distance r. The other mating piece has a base and a pair of wings held above the base to define two generally parallel channels spaced to accommodate the two parallel edges of the slot, the channels having a thickness greater than q, the span of the wings being greater than r.

Embodiments of the invention include the following features. The wings are part of a plate. The plate and base may be formed of a single sheet of metal, or be formed of any other material, such as plastic, in any other appropriate manufacturing process. The plate has two parallel edges at periphery of the wings, and chamfers are formed at the ends of the parallel edges. The wings are supported by two arms attached at opposite ends of the wings, each arm also being attached to the base.

The two channels are defined by the wings of the plate in relation to the base. Each arm includes a portion lying in the plane of the base and a contour rising from the base to the wings.

In some embodiments, the plate is canted at an angle to the base to cause self-tightening of the fastener.

The hole is generally keyhole shaped. One end of the keyhole is a round hole larger than the span of the wings. In some embodiments, the two edges of the slot are exactly parallel. In other embodiments the two edges of the slot are tapered to cause self-tightening of the fastener.

In general, in other aspects, the invention features the winged mating piece itself, and the method of fastening using the two mating pieces.

Among the advantages of the invention are the following. The fastener is easy to make, and easy to connect and disconnect. In some examples, it is formed as part of the pieces to be assembled and requires no additional mounting hardware (e.g., screws, nuts). It provides excellent rigidity in all directions (including vertical and lateral). In some applications, it enables simple modularity, thus reducing shipping, installation, and maintenance expense. In some examples, the fastener is self-tightening. The rigidity and tightness of the fastener with respect to lateral and rotational movement can be controlled by careful choice of dimensions to serve a variety of applications.

Other advantages and features will become apparent from the following description and from the claims.

DESCRIPTION

Figure 12:
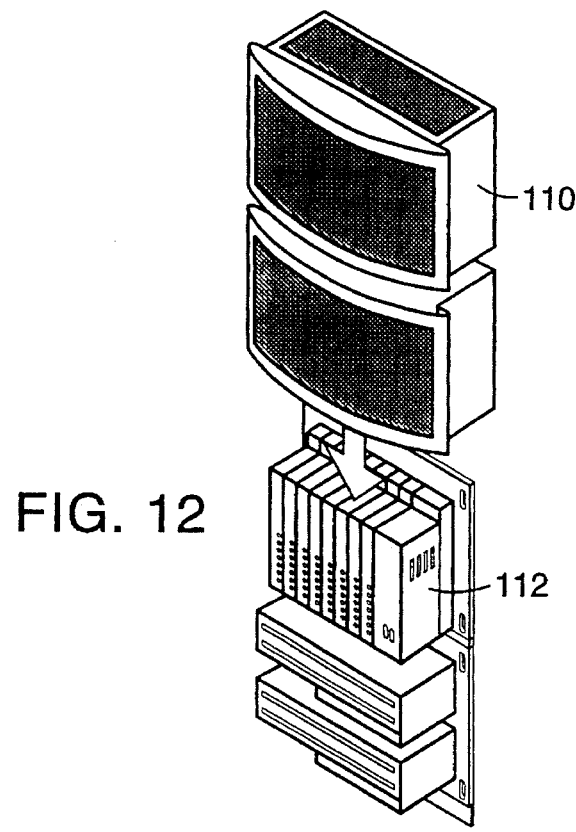
FIG. 12 is a perspective view of a cover for electronic equipment.
Figure 13:
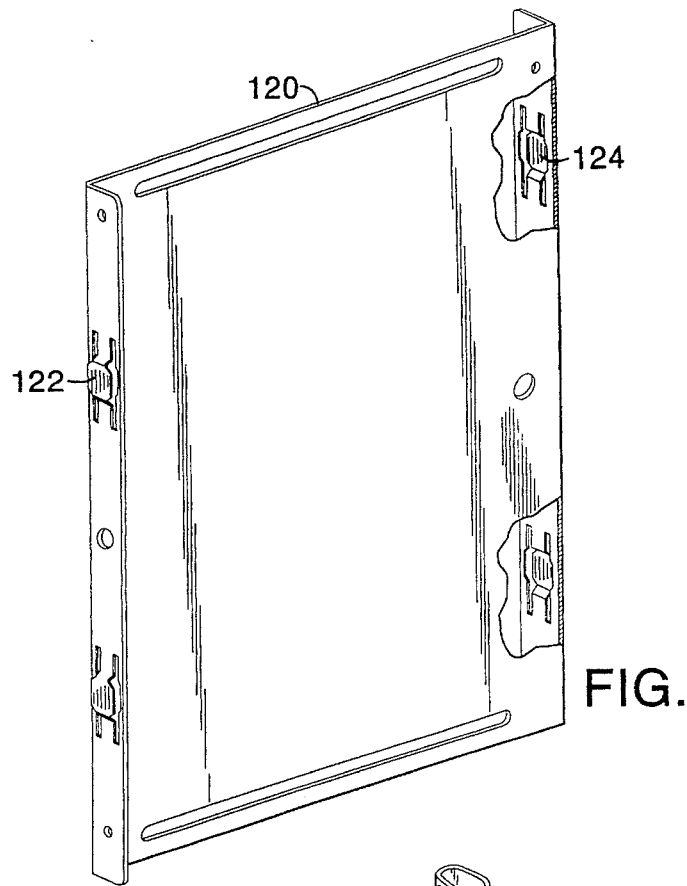
Figure 14:
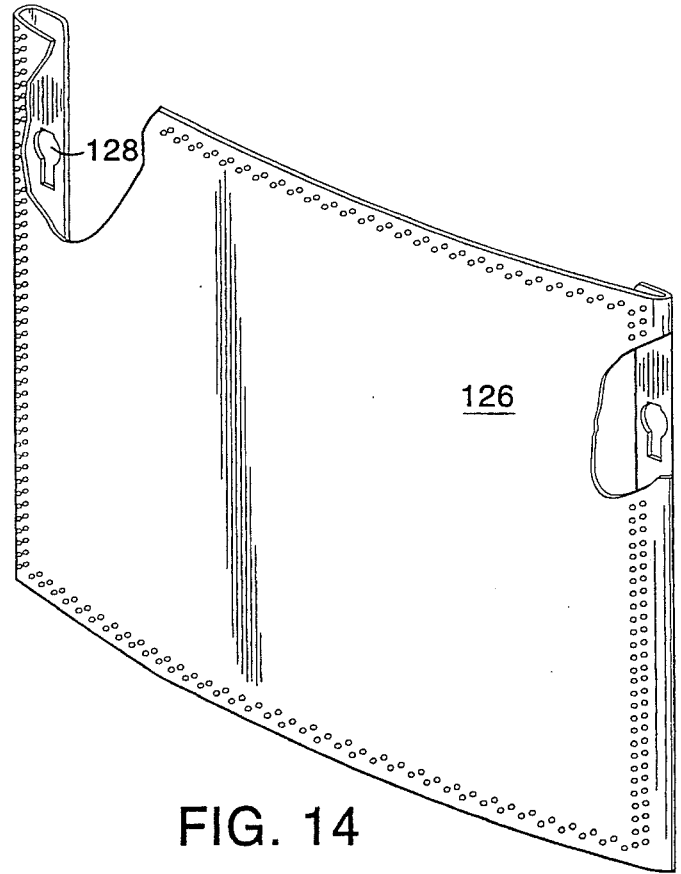
Figure 15:
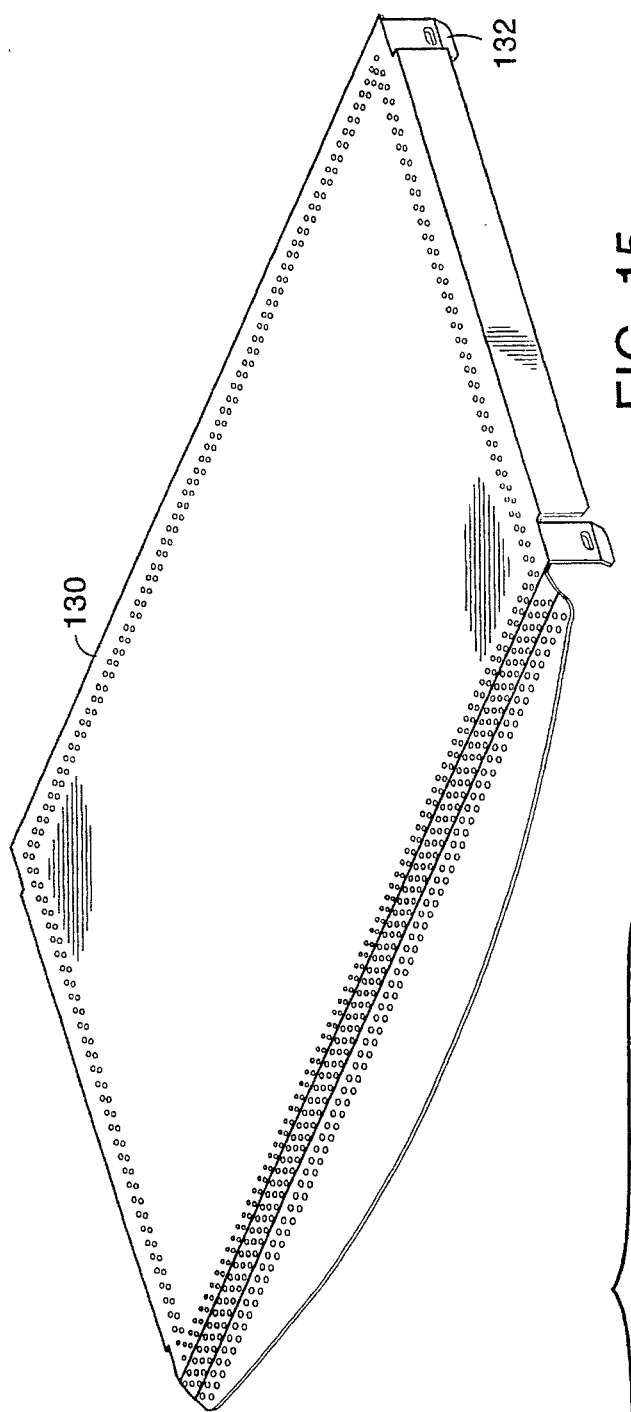

FIGS. 13, 14, and 15 are three parts of the cover of FIG. 12.

Figure 16:
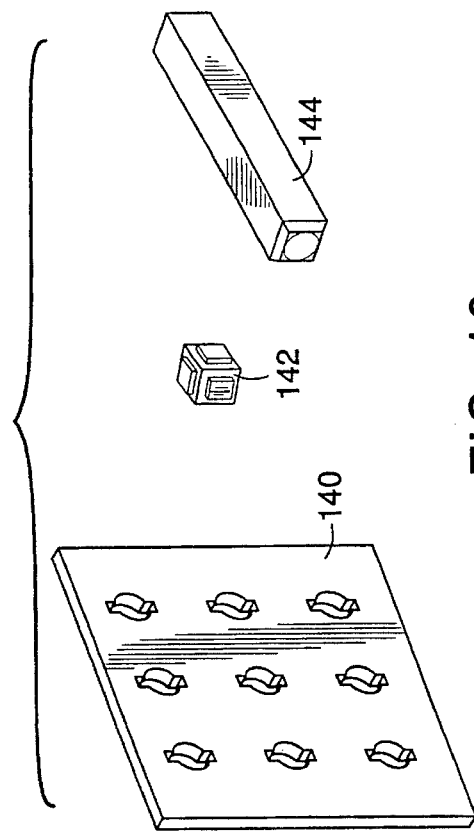

FIG. 16 is a view of pieces of a construction toy.

Figure 1:
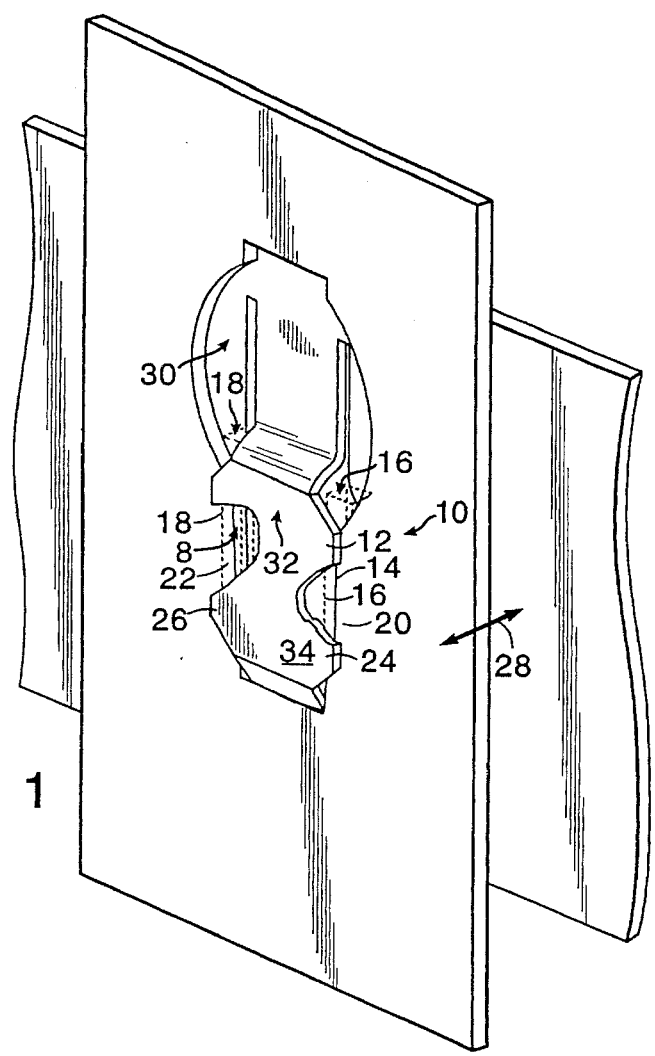
FIG. 1 is a perspective view of a fastener.

Referring to FIG. 1, a fastener 10 has two mating elements 12, 14. Element 12 defines two generally parallel channels 16, 18 (the channels are suggested by the two boxes outlined in dashed line and oriented vertically in the Fig.), and element 14 provides two generally parallel flaps 20, 22 (also oriented vertically) which lie within the channels when the elements are mated. Element 12 includes two wings 24, 26, which border the parallel channels and bear against flaps 20, 22 to control (typically to prevent) movement in the direction of arrows 28.

Element 14 is generally in the shape of a keyhole with a larger round hole 30 opening into a slot bordered by the two flaps 20, 22. The two elements 12 and 14 can be disjoined by sliding element 12 upward relative to element 14, in the direction of arrow 32 so that plate 34 (which includes wings 24, 26, may be pulled through hole 30; the two elements can then be rejoined by the reverse motion.

Figure 2:
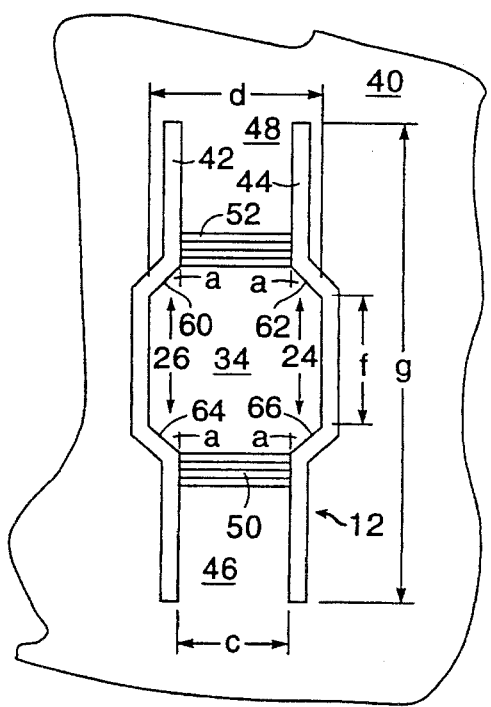
FIGS. 2 and 3 are front and side views, respectively, of one mating element of the fastener.
Figure 3:
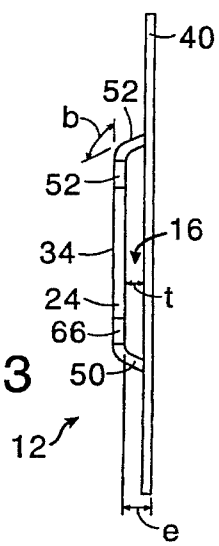

Referring also to FIGS. 2 and 3, mating element 12 is formed by cutting and pressing a steel sheet 40. Two long slots 42, 44, are cut to define plate 34 supported by a pair of rectangular arms 46, 48. The plate is then pressed to form contours 50, 52, which support plate 34 in a plane spaced from and generally parallel to the plane of the sheet 40, thus defining channels 16, 18. Plate 34 is generally rectangular and slots 42, 44 have contours which define chamfers 60, 62, 64, 66 at the four corners of plate 34. The angles marked "a" are each 47.7 degrees. Contours 50, 52 each define an angle "b" of 120 degrees.

In one example, steel plate 40 is 0.060 inches thick (an example of thickness q recited in the claims), the width "c" of each arm 46, 48 is 0.410 inches, the width "d" of the plate is 0.630 inches, the distance "e" of plate 34 above sheet 40 is 0.108 inches, the thickness "t" of channels 16, 18 is 0.12 inches, the lengths "f" of wings 24, 26 is 0.479 inches, and the total length "g" of the mating element is 1.750 inches.

Figure 4:
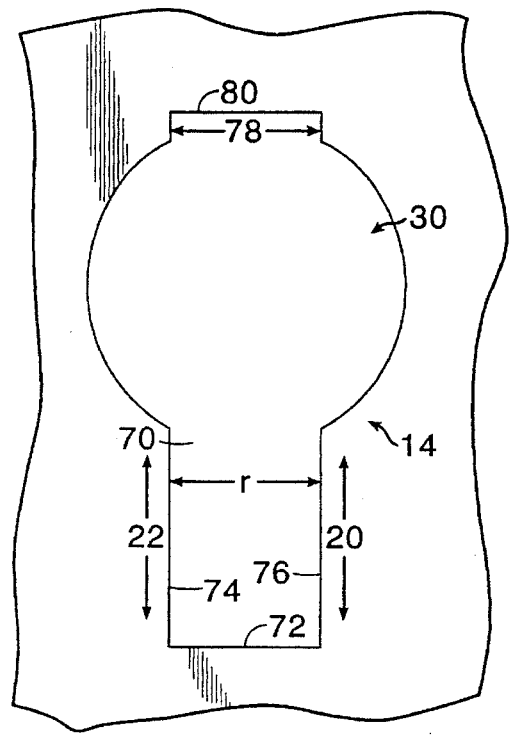
FIG. 4 is a front view of a second mating element of the fastener.

Referring to FIG. 4, in a corresponding example of mating element 14, round hole 30 is 0.937 inches in diameter, and has its center 1.049 inches from the lower end 72 of slot 70. Flaps 20, 22 are defined by two parallel cut edges 74, 76, which are spaced apart by 0.438 inches (an example of the value r recited in the claims). A short slot 78 is formed at the upper end of the mating element and the overall length from edge 80 to edge 72 is 1.544 inches.

Figure 5:
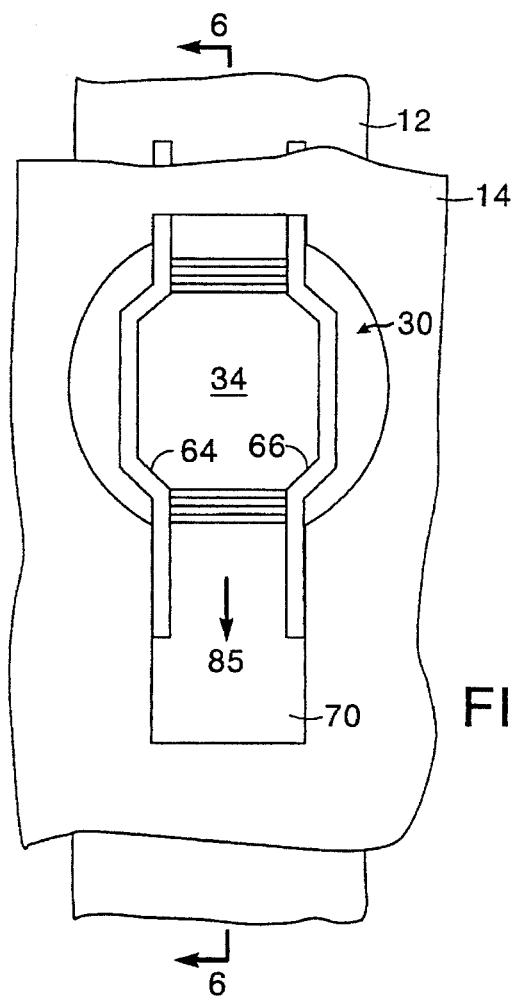
FIGS. 5 and 6 are a front view and sectional side view (at 6—6 in FIG. 5) of the fastener in one step of mating.
Figure 6:
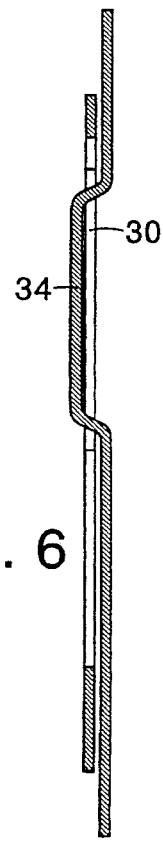

Referring to FIGS. 5 and 6, in the first step of mating the fastener elements, plate 34 is passed into hole 30. Hole 30 is large enough to provide plenty of clearance to make this step easy, even though plate 34 may initially be in any one of a variety of orientations. The second step is to slide element 12 downward with respect element 14 in the direction of arrow 85. To some degree the guiding of element 12 into slot may be guided by the chamfers.

Figure 7:
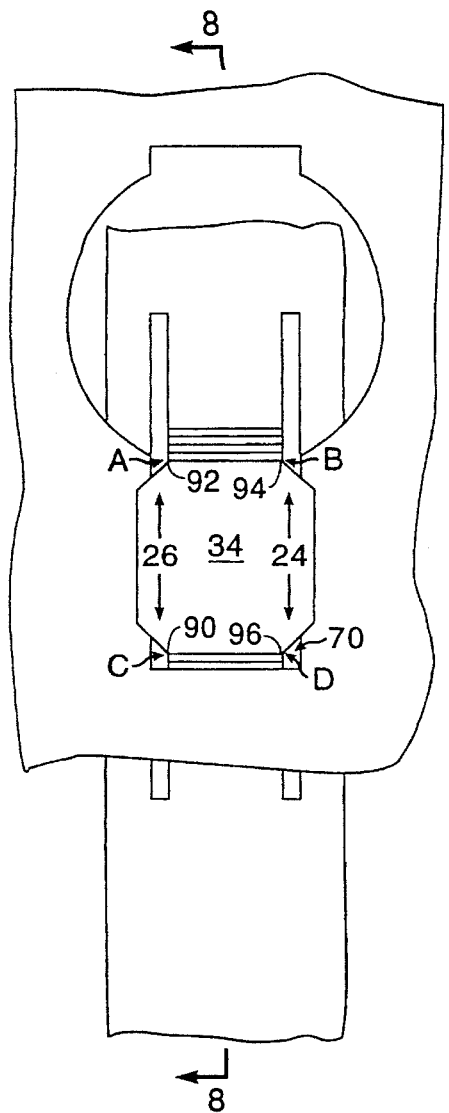
FIGS. 7 and 8 are a front view and sectional side view (at 8—8 in FIG. 7) of the fastener in a second step of mating.
Figure 8:
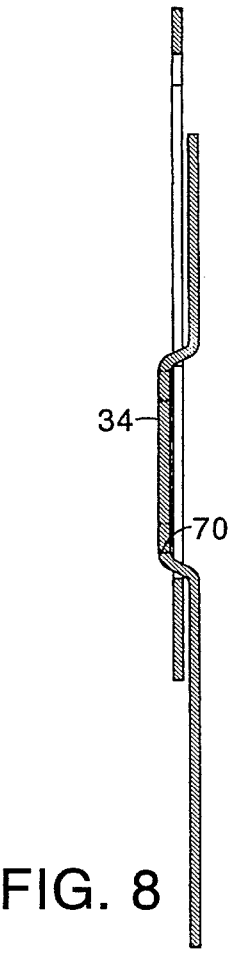

Referring to FIGS. 7, 8, at the conclusion of the mating sequence, plate 34 is positioned at slot 70. The bottom surfaces of wings 24, 26 bear against the upper surfaces of flaps 20, 22, and the bottom surfaces of flaps 20, 22, bear against the top surface of steel sheet 40. Careful choice of spacing t (FIG. 9) compared with the thickness of the sheet from which the keyhole is cut assures that the fit will be tight and will minimize relative movement of the two mating elements in the direction of arrow 28 (FIG. 1). Also careful choice of the width of slot 70 relative to the width c (FIG. 2) of arm 46 assures that the relative left and right motion and the rotational freedom of the two elements relative to one another will be minimized. In particular the four bearing points 90, 92, 94, 96 at the corners of plate 34 control the left and right motion and rotational freedom by bearing against edges 74, 76 (FIG. 4).

Unmating of the two elements proceeds in the reverse order. As plate 34 is moved upward into hole 30, contour 52 will eventually strike upper edge 80 of the short slot 78, indicating that by reversing the motion slightly the plate 34 will now be centered in hole 30 for removal.

Other embodiments are within the scope of the following claims.

Figure 9:
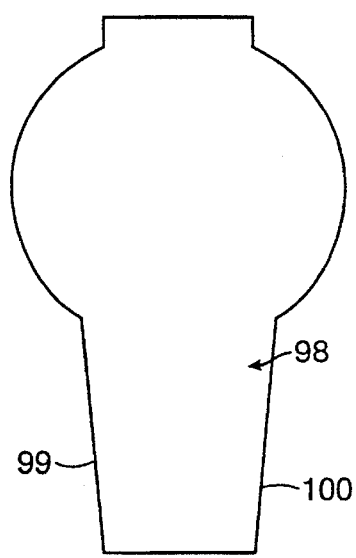
FIG. 9 is a front view of another second mating element.

For example, referring to FIG. 9, slot 98 could have tapered edges 99, 100, which would cause self-tightening of the fastener as element 12 is forced the slot. (Note that the edges of the slot shown in FIG. 1 are actually tapered in this way and thus are not fully consistent with FIGS. 4 through 8).

Figure 10:
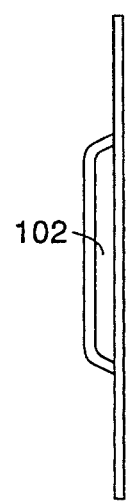
FIG. 10 is a side view of another first mating element.

Referring to FIG. 10, plate 34 may similarly be formed in a manner which provides a taper to the space 102, providing a self-tightening effect when the two elements are mated.

Figure 11:
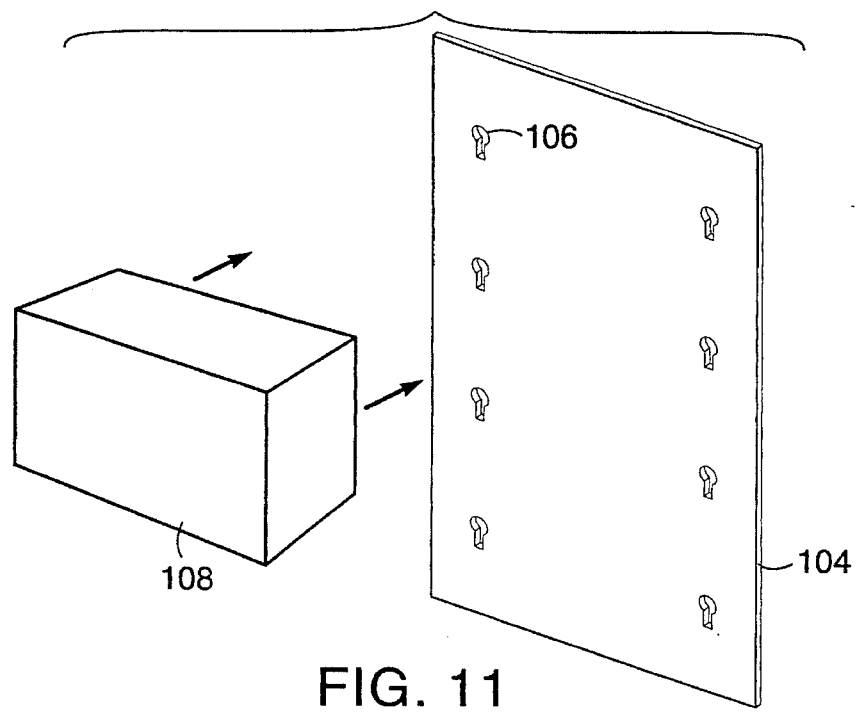
FIG. 11 is a perspective view of a suspension structure using the fastener.

The fastener has a wide variety of applications. Referring to FIG. 11, in one application, a plate 104 with columns of keyholes 106, is held vertically, e.g., by mounting it on a wall. Then equipment, tools, containers, or other structures 108 are provided with one or more of the other mating element 12 (not seen in FIG. 11). This permits easy mounting and demounting. When more than one fastener is used on structure 108, they together provide rigid support in all directions, especially left and right and front-to-back. Additional detail of such an arrangement applied in a modular scheme is shown in copending U.S. Pat. No. 5,333,744.

Referring to FIG. 12, fasteners may also be used to create assemblies such as a protective cover 110 for electronic equipment 112.

Referring to FIG. 13, the side panels 120 of the cover have mating elements 122, 124 on front and rear flanges. Elements 124 mate with slots of the kind shown in FIG. 11. Referring to FIG. 14, front panel 126 has slots 128 which mate with elements 122 (FIG. 13) in order to assemble the front and two sides of the cover.

Referring to FIG. 15, a top panel 130 has conventional snaps 132 on both ends, for holding the top onto the side panels.

Referring to FIG. 16, a child's construction toy could be formed of a variety of components including one or more different sized and shaped panels 140 having arrays of slots; cubes and other joiners 142, with mating elements arranged on the faces; and bars and other structural elements 144, with mating elements on the ends.

Other applications include furniture assembly.

The two mating elements need not be formed as metal stampings. They could be, e.g., molded, in plastic. Also they can be formed as independent pieces to be glued or sewn or riveted to other pieces. The fitting can be loose to permit a controlled amount of movement in any direction. The keyhole need not be round. The keyhole could have symmetrical slots at both ends.

What is claimed is:

1. A fastener comprising:

two mating pieces, one of the mating pieces having a rigid surface of thickness q, and a hole in the surface, the hole including a slot defined by two edges of the slot, the other of the mating pieces having a base and a plate formed integrally with the base, the plate having a longitudinal axis and a pair of wings integrally formed with the plate, the plate and the wings supported by two arms which are attached to the ends of the plate and the base along the longitudinal axis of the plate, the wings disposed above the base to define two channels tapered with respect to the longitudinal axis of the plate and spaced to accommodate the two edges of the slot, the wings having a span smaller than the size of the hole and greater than the width of the slot, the plate having two parallel edges at the periphery of the wings and chamfers for guiding of the wings into the hole, the chamfers formed at ends of the parallel edges.

2. The fastener of claim 1 wherein the plate and base are formed of a single sheet of metal.

3. The fastener of claim 2 wherein each of the two arms includes a first portion lying in the plane of the base and a second, contoured portion rising from the base to the plate.

4. The fastener of claim 1 wherein the plate is canted at an angle to the base to cause self-tightening of the fastener.

5. The fastener of claim 1 wherein the hole is generally keyhole shaped.

6. The fastener of claim 5 wherein one end of the keyhole is a round hole larger than the span of the wings.

7. The fastener of claim 1 wherein the two edges of the slot are exactly parallel.

8. The fastener of claim 1 wherein the two edges of the slot are tapered to cause self-tightening of the fastener.

9. A first mating piece for connection to a second mating piece, said first mating piece comprising:

a base and a plate formed integrally with one another, the plate having a longitudinal axis and a pair of wings held above the base to define two channels tapered with respect to the longitudinal axis of the plate, edges of the wings defining two parallel edges of the plate, chamfers formed at the edges of said wings, said chamfers for guiding said wings into a hole of the second mating piece, the chamfers lying at corners of the plate, the plate and wings being supported by two arms which are attached to the ends of the plate and the base along the longitudinal axis of the plate.

10. A method of fastening comprising:

providing one mating piece having a rigid surface of thickness q, and a hole in the surface, the hole including a slot defined by two tapered edges, providing a second mating piece having a base and a plate, the plate having a longitudinal axis and a pair of wings integrally formed with the plate, the plate and wings being supported by two arms which are attached to the ends of the plate and the base along the longitudinal axis of the plate, and the wings being held above the base to define two channels tapered with respect to the longitudinal axis of the plate and spaced to accommodate the two tapered edges of the slot and mating the pieces by slidably inserting the edges of the slot of the one mating piece into the ends of the channels of the second mating piece and sliding the two mating pieces relative to each other so that the edges of the slot seat in the tapered channels in a self-tightening engagement.

* * * * *